UNITED STATES PATENT OFFICE.

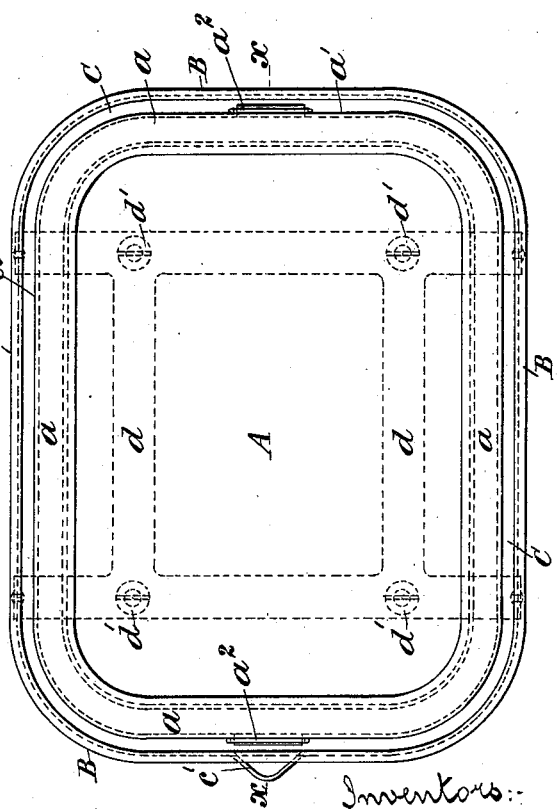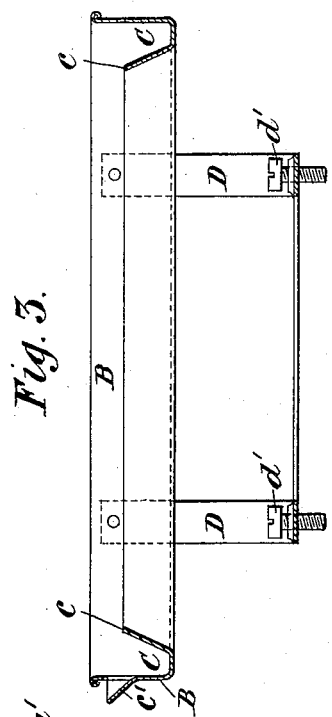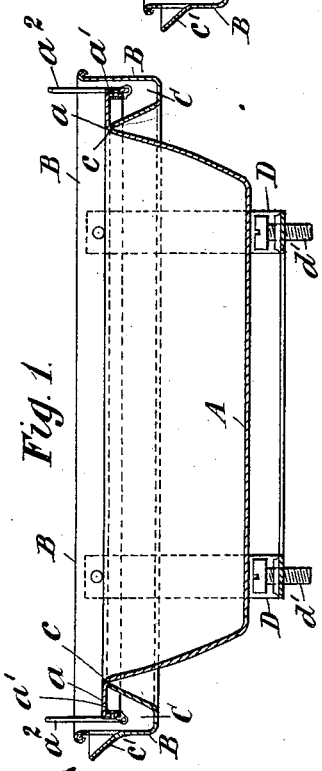

THOMAS FLETCHER BRAIME AND JAMES HENRY BRAIME, OF LEEDS, ENGLAND.

APPARATUS FOR COOKING OR BAKING PIES, &c.

SPECIFICATION forming part of Letters Patent No. 613,752, dated November 8, 1898.

Application filed July 15, 1898. Serial No. 686,054. (No model.)

*To all whom it may concern:*

Be it known that we, THOMAS FLETCHER BRAIME and JAMES HENRY BRAIME, subjects of the Queen of Great Britain, residing at Leeds, in the county of York, England, have invented new and useful Improvements in or Relating to Apparatus for Cooking or Baking Pies and the Like, of which the following is a specification.

This invention relates to improved apparatus for cooking or baking fruit and other pies and the like. Its object is to prevent the syrup, juice, or gravy or the like, all of which are hereinafter termed and included in the term "juice," which frequently during the cooking or baking process oozes or boils out, from running down the dish or other receptacle onto the shelf or plate of, say, the oven and producing an unpleasant odor or smell, as well as spoiling the pastry.

In the drawings hereunto annexed we have illustrated how this invention may be carried into practice.

Figure 1 is a longitudinal section on line $x\,x$, Fig. 2, of a dish combined with a holder or supporting device; Fig. 2, a plan of same looking on the top; Fig. 3, a longitudinal section of holder or supporting device; Fig. 4, a transverse section of holder or supporting device.

Similar letters refer to similar parts throughout the views.

A is the dish or other receptacle, which is combined with a holder or supporting device B, provided with a receiver or trough, hereinafter termed the "trough" C, for the storage of the overflowing juice, syrup, or the like, both of which are constructed as hereinafter described.

The dish or other receptacle, hereinafter termed the "dish" A, is provided with an outward horizontal flange $a$ around its top and arranged to project therefrom at or about a right angle thereto. From the outer edge of the horizontal flange $a$ a lip $a'$ is arranged to project downwardly therefrom. On the flange $a$, which forms a kind of seating, the crust of the pie is placed. The said downwardly-projecting lip $a'$ may be made of such a depth that any syrup, juice, or other liquid coming from the interior of the dish and which runs over the outward surface of the flange $a$ or the crust placed thereon will then run down the projecting lip $a'$ until it is forced, when in sufficient quantities, to drop off the edge of the lip into the trough C. The lip $a'$ prevents the juice, syrup, or the like flowing around the edge of the flange $a$ onto the inner or under surface thereof, so as to afterward pass onto the outer surface of the dish, and thence downward over the same and so on to the oven-plate or other surface upon which the dish may be placed. Loops or handles $a^2$ may be fixed or attached to the lip $a'$ or flange $a$ for removal purposes.

The holder B may be composed of a framework made of, say, metal or wire, of the same, or nearly so, contour of the dish to be placed thereon or therein and which is arranged to surround the flange $a$ and lip $a'$ of the dish, and which may form a vertical, or nearly so, extended edge for the hereinafter-described trough C.

With the holder B is fixed or otherwise combined a suitably-shaped trough C, provided with an upwardly-projecting edge $c$. In the drawings the holder B and trough C are shown formed in one piece; but they may be made separately and to fit one within the other. The holder alone or combined holder and trough may be so formed that when the dish is placed in or on the same the downwardly-projecting lip $a'$ on the flange $a$ of the dish A shall be so situated as to overhang the interior or cavity of the trough C, or it may be so arranged as to pass downward into the interior of the same, as shown at Fig. 1, thereby allowing the juice to drop away from the edge of the said downwardly-projecting lip $a'$ on the flange $a$ into the interior of the trough C and the juice retained there until it is required to be removed from the same. The trough C may be provided with a spout C', which may project through or from a part of the framework B, but in communication with trough C, for facilitating the removal of the juice from the trough.

The holder B may also be formed so as to support or elevate the bottom of the dish to a required distance from the heating-surface of the baking apparatus by means of fixed props or supports D, braced together by the strips $d$, or they (the props) may be provided with the adjusting-screws $d'$, whereby the height of the bottom of the dish A above the surface on which the holder B is placed may be regulated. The holder B and props D form a kind of cradle for supporting the dish A by its flange $a$.

By the above combination of downwardly-projecting edged dish and the means of supporting it by the holder over the trough C the overflowing juice is compelled to collect in the said trough C without passing over the outer surface of the dish, and consequently disfiguring it. At the same time the juice is effectually prevented from passing onto any other surface other than the interior of the trough, which is situated at a suitable distance from the part of the oven or the like upon which the holder B is placed, after it has passed over the flange $a$ or crust thereon to the edge of the lip, thereby preserving the juice from being overheated and spoiled or causing unpleasant odors or fumes.

Having now particularly described and ascertained the nature of our said invention, what we claim, and desire to be secured to us by Letters Patent, is—

1. The combination in a dish-holder in skeleton form comprising a framework which surrounds the flange and lip of a dish, a trough arranged within said framework and also to surround the body portion of a dish placed within it and to receive any overflowing juice, said framework and trough being mounted upon supports capable of adjustment by screws, arranged as herein set forth.

2. The combination of a dish provided with a horizontal flange around its upper edge, a lip projecting downwardly from the outer under edge of said flange, a holder in skeleton form comprising a framework which surrounds the flange and lip of said dish, a trough adapted to surround the body portion of said dish and to receive the drippings from the said downwardly-projecting lip arranged at a distance above the bottom of the trough, the supports secured to said trough, the means described for adjusting the height of the same, and a spout communicating with said trough for facilitating the removal of the juice, all arranged as herein set forth.

In witness whereof we have hereunto set our hands in presence of two witnesses.

THOMAS FLETCHER BRAIME.
JAMES HENRY BRAIME.

Witnesses:
WILLIAM SADLER,
FLORENCE WARD.